(12) United States Patent
Lawton (10) Patent No.: US 11,582,027 B1
(45) Date of Patent: Feb. 14, 2023

(54) SECURE COMMUNICATION WITH INDIVIDUAL EDGE DEVICES OF REMOTE NETWORKS THAT USE LOCAL SECURITY CREDENTIALS

(71) Applicant: Amazon Technologies, Inc., Seattle, WA (US)

(72) Inventor: Craig Lawton, Mitcham (AU)

(73) Assignee: Amazon Technologies, Inc., Seattle, WA (US)

( * ) Notice: Subject to any disclaimer, the term of this patent is extended or adjusted under 35 U.S.C. 154(b) by 338 days.

(21) Appl. No.: 16/456,850

(22) Filed: Jun. 28, 2019

(51) Int. Cl.
- *H04L 9/08* (2006.01)
- *H04L 9/32* (2006.01)
- *H04L 9/14* (2006.01)
- *H04L 9/40* (2022.01)

(52) U.S. Cl.
CPC .......... *H04L 9/0827* (2013.01); *H04L 9/0819* (2013.01); *H04L 9/0847* (2013.01); *H04L 9/14* (2013.01); *H04L 9/321* (2013.01); *H04L 63/0876* (2013.01)

(58) Field of Classification Search
CPC ..... H04L 9/321; H04L 9/0847; H04L 9/0827; H04L 9/14; H04L 63/0876; H04L 9/0819
See application file for complete search history.

(56) References Cited

U.S. PATENT DOCUMENTS

| | | | |
|---|---|---|---|
| 9,288,059 B2 | 3/2016 | Nix | |
| 9,860,677 B1* | 1/2018 | Agerstam | H04W 4/70 |
| 2007/0180227 A1* | 8/2007 | Akimoto | H04L 63/1408 |
| | | | 713/153 |
| 2013/0036305 A1* | 2/2013 | Yadav | H04L 9/321 |
| | | | 713/168 |
| 2013/0077557 A1* | 3/2013 | Chen | H04W 24/02 |
| | | | 370/315 |
| 2013/0227291 A1* | 8/2013 | Ahmed | H04L 63/0884 |
| | | | 713/171 |
| 2014/0044260 A1* | 2/2014 | Baba | H04L 9/0827 |
| | | | 380/255 |
| 2016/0164678 A1 | 6/2016 | Nix | |
| 2018/0063079 A1* | 3/2018 | Ding | H04L 63/0464 |
| 2018/0114595 A1* | 4/2018 | Stern | H04L 67/1004 |
| 2019/0089747 A1* | 3/2019 | Wang | H04L 9/0841 |
| 2019/0174449 A1* | 6/2019 | Shan | H04W 60/00 |
| 2019/0205541 A1* | 7/2019 | Zimny | G06F 21/575 |

* cited by examiner

*Primary Examiner* — Huan V Doan
(74) *Attorney, Agent, or Firm* — Robert C. Kowert; Kowert, Hood, Munyon, Rankin & Goetzel, P.C.

(57) ABSTRACT

A device management service of a provider network maintain a device repository that is accessible to a remote managed network. The device management service assigns different service credentials for different edge devices indicated by the device repository. For a particular edge device, the device management service provides, based on the service credentials assigned for the edge device, secure transmission of a message between the device management service and a network manager of the managed network. The network manager of the managed network provides secure transmission of the message between the network manager and the edge device based on local credentials assigned for the edge device.

20 Claims, 8 Drawing Sheets

SECURE COMMUNICATION WITH INDIVIDUAL EDGE DEVICES OF REMOTE NETWORKS THAT USE LOCAL SECURITY CREDENTIALS

BACKGROUND

The Internet of Things (IoT) is a phrase given for the interconnection of computing devices scattered around the globe within the existing internet infrastructure. IoT devices may be used for a variety of consumer and commercial applications. For example, IoT devices may be embedded into personal devices of home IoT networks such as doorbell cameras and baby monitors as well as industrial devices of manufacturing IoT networks such as sensors and controllers at an automotive plant.

IoT networks may implement custom or vendor-specific device management techniques to accomplish various goals. For example, certain types of edge devices designed for use in low-powered wide-area (LPWA) networks may implement customized communication techniques for IoT devices in order to reduce power consumption by the IoT devices. These self-managed IoT networks may implement their own local security credentials to securely transmit messages within the network to and from IoT devices. They may also include their own IoT device repositories to track and manage edge devices.

Due to the use of local security credentials in self-managed IoT networks, it may be difficult or infeasible to remotely manage security and access control for the IoT devices (e.g., using a remote IoT management service in the cloud). Furthermore, remotely managing such a network would require duplicating information in the device repository of the IoT network, which may be costly and lead to data conflicts. Therefore, attempts to remotely manage such IoT networks may lead to numerous communication failures and inadequate security management of the IoT network.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for providing secure communication with individual edge devices of a remote managed network that use local credentials for secure communication with the IoT devices (also referred to herein as "edge devices"). Embodiments may allow a device management service of a provider network to implement end-to-end device security and access controls for individual edge devices of a remote managed network.

In embodiments, a message may be securely transmitted between the device management service and a network manager of the remote managed network using service credentials (e.g., encryption keys) assigned for a particular edge device by the device management service and the message may be securely transmitted between the network manager and the edge device using local credentials (e.g., other encryption keys) assigned for the particular edge device. In some embodiments, a locally managed network may assign the same local credentials for two or more edge devices. However, the device management service may still assign different service credentials to each of those edge devices in order to uniquely identify each device and control access to each individual device.

As used herein, a remote network (or remote managed network) may be a network that is remote from the provider network (or another network/device). Therefore, data sent from/to the remote managed network to/from the provider network may be transmitted through one or more portions of the internet and/or another wide-area network in between the managed network and the provider network.

In embodiments, a device on the remote managed network (e.g., connected to the managed network as a locally connected device and/or behind a gateway router or firewall of the managed network) may be considered remote with respect to any devices on the provider network (e.g., devices connected to the provider network as a locally connected device and/or behind a gateway router or firewall of the provider network). Similarly, a device on the provider network may be considered remote with respect to any devices on the remote managed network.

As used herein, a remote managed network (or managed network) may be a network that implements its own local access credentials (also referred to as "local security credentials" or "local credentials") to securely transmit messages within the network to and from IoT devices. For example, a remote managed network may include a network manager (e.g., running on one or more hub devices) that controls communication to and from the respective edge devices, including securely sending/receiving data to/from edge devices (e.g., using encrypted communication techniques/encryption keys to encrypt messages).

In embodiments, the network manager of a managed network may provide secure transmission of a message between the network manager and a particular edge device (e.g., to and/or from the edge device) based on local credentials assigned for the particular edge device (e.g., using a local encryption key that may be inaccessible from outside of the network manager and/or the particular edge device). In some embodiments, different edge devices may be assigned different credentials (e.g., by the network manager and/or an administrator when configuring the edge devices). In embodiments, the local credentials of the edge devices and/or network security protocols used by the edge devices may be unknown and/or inaccessible outside of the managed network (e.g., unknown and/or inaccessible to a device management service of a remote provider network).

Attempts to remotely manage aspects of a managed network (e.g., by a device management service of a remote provider network) may fail or may be extremely difficult. For example, implementing a "custom integration" to remotely manage various aspects of a managed network may involve bidirectional synchronization of device attributes between the managed network's device repository and the device management service, data conversion of bytes to JavaScript object notation (JSON), and/or message queuing telemetry transport (MQTT) packet forwarding.

Various problems may arise when attempting to remotely manage aspects of a managed network. In embodiments, a remote device management service may be unable to configure end-to-end device security and access controls for each edge device (e.g., on an individual device level). For example, in various embodiments, a managed network provides security, including access credentials, up to an integration point and the custom integration allows all device flows between the managed networks data plan and the device management service.

Embodiments improve security when remotely managing a managed network, while simplifying various aspects of device management. For example, embodiments may provide end-to-end per-device security configuration and access control from a single management point (e.g., a device management service of a remote provider network). Embodiments provide extensible techniques for edge device management and security for various third-party managed network providers. With the advent of various new network technologies (e.g., 5G, etc.), embodiments may simplify and remove undifferentiated heavy lifting for provider network clients and network providers, while improving end-to-end security.

In various embodiments, any suitable security communication protocols may be used to protect data that is being sent between any devices, resources, and/or networks (e.g., provider network, managed networks, edge devices, etc.) based on service credentials and/or local credentials (e.g., one or more encryption keys) according to asymmetric and/or symmetric encryption techniques. For example, data of messages may be encrypted using SSL (secure socket layer), TLS (transport layer security), HTTPS (secure hypertext transfer protocol), and/or any other suitable network security protocol.

Figure 1:
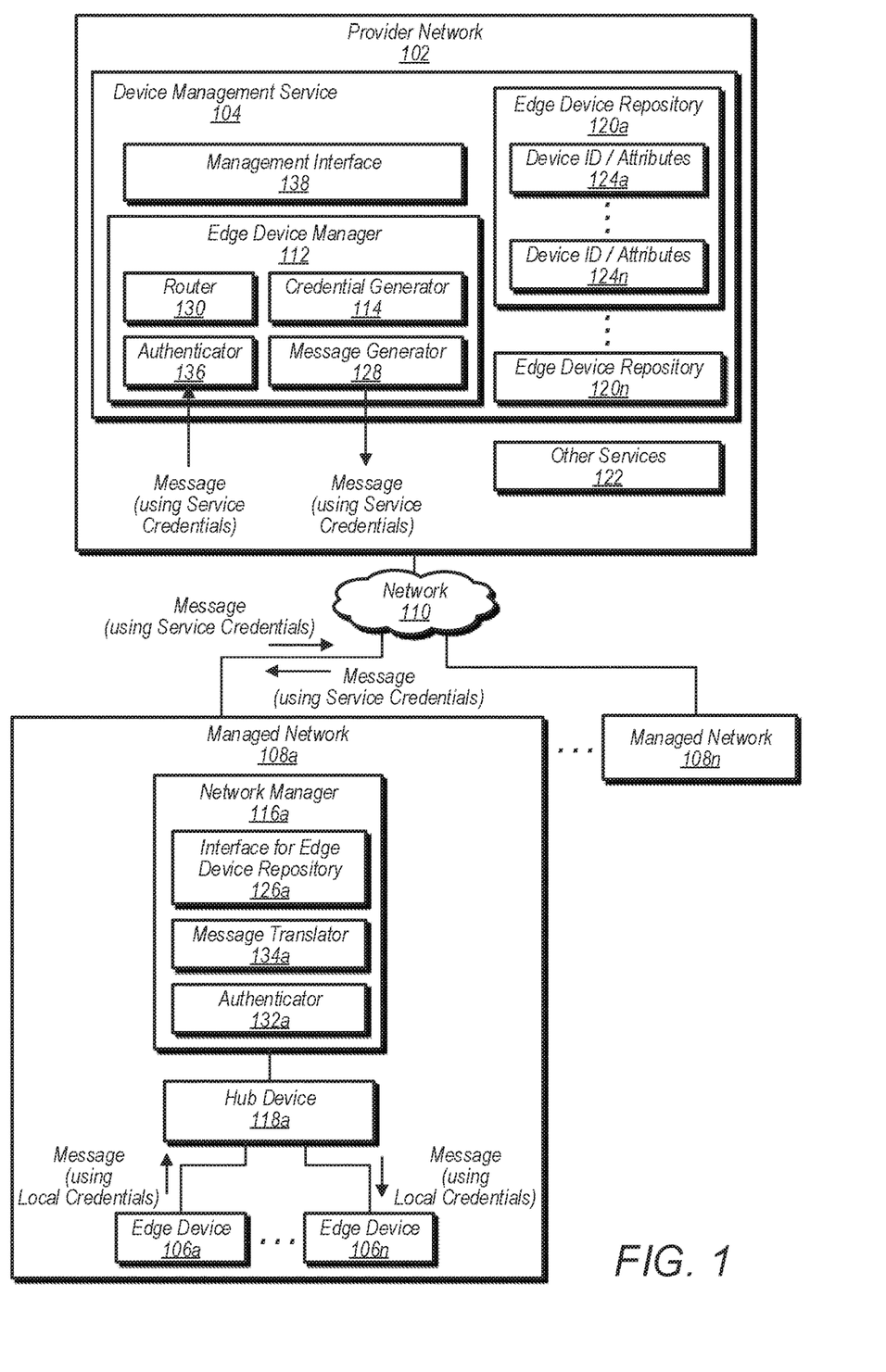
FIG. 1 illustrates a system for providing secure communication with individual edge devices of a remote managed network that use local credentials for secure communication with the edge devices, according to one embodiment.

FIG. 1 illustrates a system for providing secure communication with individual edge devices of a remote managed network that uses local credentials for secure communication with the edge devices, according to one embodiment. The example provider network 102 includes a device management service 104 that may manage end-to-end device-level security configuration and access control for edge devices 106 of one or more remote managed networks 108. As depicted, a wide-area network 110 (e.g., the internet) may allow for communication of data between the provider network 102 and the managed networks 108.

As shown, the device management service 104 includes an edge device manager 112 with a credential generator 114 that generates credentials used by the service to provide secure communication of messages (e.g., messages directed to particular edge devices) between the device management service 104 and a network manager 116. In some embodiments, messages may be routed from the edge devices through one or more hub devices 118 of the managed network 108. The hub device(s) may then forward the messages to the network manager 116 before they are translated and sent to the device management service. Similarly, messages received by the network manager from the device management service may be translated and sent to one or more edge devices through the hub device(s). Therefore, the network manager may execute on one or more computing devices of the managed network 108 and function as an interface layer between the hub device/edge devices and the provider network. In some embodiments, at least a portion (or all) of the network manager may execute on the hub device (or multiple hub devices). Regardless of which devices the network manager is running on, it may still serve as an interface layer to translate messages.

In embodiments, the device management service 104 may assign different service credentials for each of the edge devices indicated by an edge device repository 120 for a managed network (e.g., managed network 108a). In some embodiments, the device management service 104 may assign at least some of the same service credentials for two or more of the edge devices.

In embodiments, device management service 104 maintains/stores the edge device repository 120 to as part of the device management service 104 or as part of a data store provided by another service 122 (e.g., a data storage service). As depicted, the edge device repository 120 indicates (e.g., stores) attributes for respective edge devices of a managed network (e.g., managed network 108a). As shown, any number of different edge device repositories 120 may be maintained to indicate attributes for respective edge devices of any number of managed networks.

As depicted, the device repository 120 for a managed network indicates each edge device by storing a record 124 for the edge device that indicates a device ID that uniquely identifies the edge device with respect to the edge devices of a managed network (e.g., managed network 108a). Each record 124 may also indicate/store any number of other attributes of the edge device or assigned/associated with the edge device (e.g., network address, configuration data, etc.). In embodiments, the device repository 120 is accessible to the network manager 116 of a given managed network (e.g., managed network 108a) via an interface 126.

In embodiments, the device repository 120 may be stored as a directory-based data store or any other type of data store. The device repository 120 may be accessed in accordance with a lightweight directory access protocol (LDAP). Therefore, the network manager may access (e.g., obtain/download) one or more attributes of the device repository for one or more particular edge devices according to the LDAP protocol.

In the example embodiment, the message generator 128 of the device management service 104 generates a message for a particular edge device 106 based on the service credentials provided by the credential generator 114. For example, the message generator 128 may obtain a message from a router 130 that is directed to the particular device (e.g., based on the device ID indicated in the message), encrypt and/or sign at least a portion of the message using the service credentials assigned for the particular edge device (e.g., using one or more encryption keys assigned for the device), and transmit the encrypted and/or signed message to the network manager 108a of the managed network. In embodiments, the router 130 may receive the message from another service or device of the provider network before providing it to the message generator 128 (e.g., a service that transmits commands to cause the edge device to perform one or more functions).

In embodiments, when the network manager 116 receives the encrypted and/or signed message and may decrypt the message based on at least some of the service credentials assigned for the edge device (e.g., one or more encryption keys). An authenticator 132 may authenticate the signed message based on at least some of the service credentials assigned for the edge device (e.g., using another key(s) or the same key(s) to decrypt at least a portion of the message).

If the message is authenticated, then a message translator 134 of the managed network 108a may translate the service credentials for the edge device to local credentials for the edge device (e.g., based on a mapping of the service credentials for the edge device to the local credentials for the edge device that is maintained by the network manager) and apply the local credentials to the message (e.g., in accordance with the encryption techniques and/or network security protocols used by the managed network, which may be different than those used by the device management service 104). In embodiments, the network manager may encrypt and/or sign at least a portion of the message using the local credentials assigned for the particular edge device (e.g., using one or more local encryption keys assigned for the device), and transmit the encrypted and/or signed message to edge device. As discussed herein, a similar process of encrypting and/or signing messages may be used in reverse, to securely transmit messages from a particular edge device up to the device management service.

In some embodiments, any number of other modifications may be made to the message before and/or after it is authenticated to make the message suitable for transmission and/or to make the message suitable for application of the local credentials. After the local credentials are applied to the message, the message may then be securely transmitted from the network manager 116 to the particular edge device based on the local credentials and/or in accordance with a network security protocol. In embodiments, the network security protocol used to securely transmit messages between the network manager and the edge devices may be different than the network security protocol used to securely transmit messages between the network manager and the device management service 104 (e.g., TLS, HTTPS, SSL, etc.).

In the depicted embodiment, when the network manager 116 receives a message from an edge device (or a message originating from an edge device) that is directed to the provide network, the a message translator 134 may translate the local credentials for the edge device to service credentials for the edge device (e.g., based on a mapping of the service credentials for the edge device to the local credentials for the edge device that is maintained by the network manager) and apply the service credentials to the message (e.g., in accordance with the encryption techniques and/or network security protocols used by the provider network and/or the device management service, which may be different than those used to securely transmit messages between the network manager and the edge devices). For example, the network manager may encrypt and/or sign the message using one or more of the service credentials assigned for the edge device (e.g., one or more encryption keys) and transmit the message to the device management service.

In some embodiments, any number of other modifications may be made to the message before and/or after it is translated or to make the message suitable for transmission to the device management service and/or to make the message suitable for application of the service credentials. After the service credentials are applied to the message (e.g., after the message is signed using an encryption key assigned for the edge device), the message may then be securely transmitted from the network manager 116 to the device management service based on the service credentials and/or in accordance with a network security protocol.

As depicted, the message may then be received by the authenticator 136 of the edge device manager. The authenticator may decrypt and/or authenticate the signed message based on the service credentials assigned for the edge device (e.g., using another key(s) or the same key(s) to decrypt and/or authenticate at least a portion of the message). If the message is authenticated, then the authenticator 136 may accept the message and route the message to an endpoint at the provider network (e.g., another service).

In the depicted embodiment, the device management service includes a management interface 138 that may be used by a client or administrator to configure and/or make changes to the device management service. For example, new edge devices and/or attributes for edge devices may be added, removed, and/or modified. In embodiments, polices, edge device configurations, and/or other attributes for one or more edge devices may be added, removed, and/or modified. Security-related settings may also be modified. For example, types of credentials or expiration times for credentials may be changes for one or more edge devices of the managed network.

Figure 2:
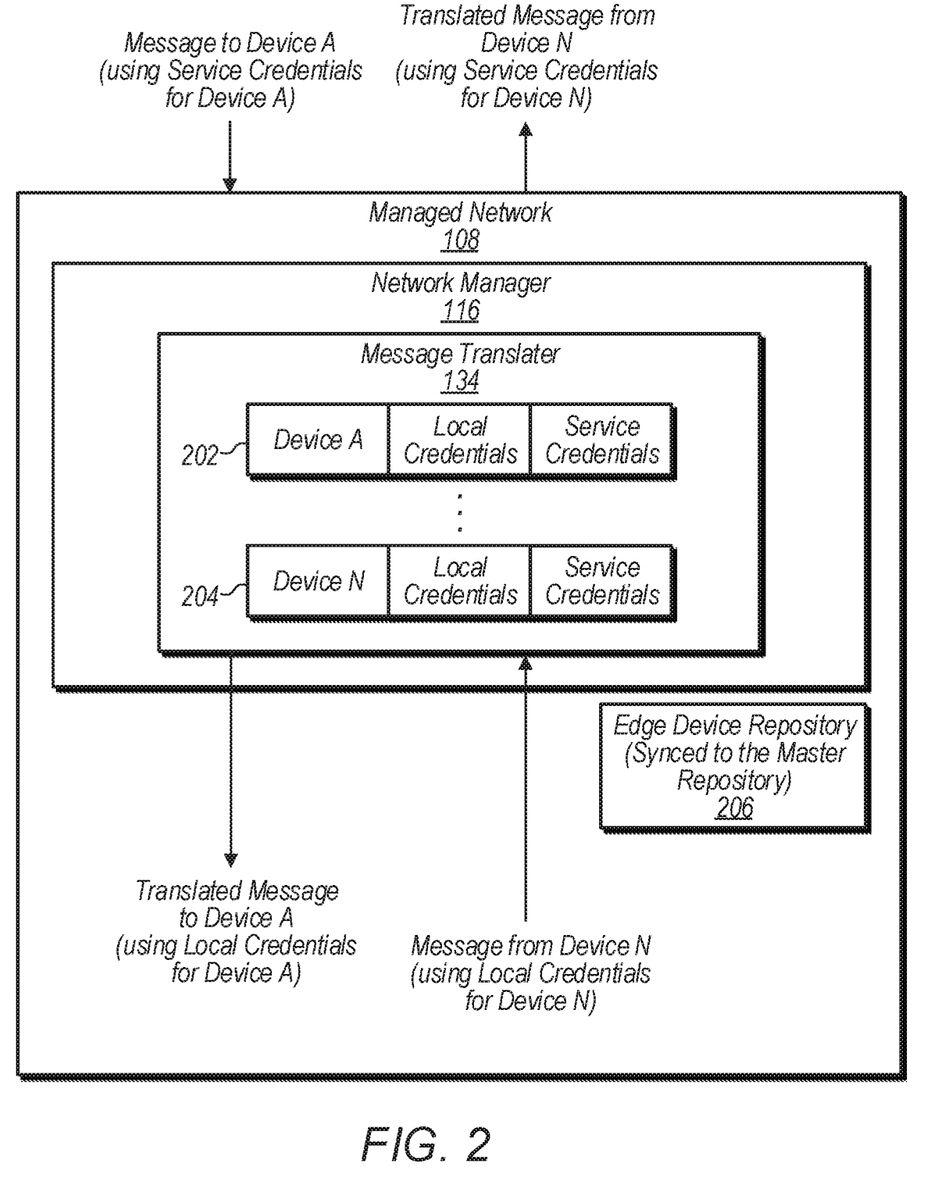
FIG. 2 illustrates a network manager that translates a message from a remote provider network to an edge device of a managed network and translates a message from another edge device of the managed network to the remote provider network, according to one embodiment.

FIG. 2 illustrates a network manager of a managed network that translates a message from a remote provider network to an edge device of the managed network and translates a message from another edge device of the managed network to the remote provider network, according to one embodiment.

As depicted, the network manager 116 and/or message translator 134 receives a message from the device management service (the message may originate from another service of the provider network before being routed to the device management service for transmission) directed to edge device A of a managed network. The network manager decrypts and/or authenticates the message based on the service credentials assigned for edge device A and translates the message into a translated message based at least on a mapping 202 of the service credentials assigned for edge device A to local credentials assigned for edge device A (e.g., by applying local credentials to the message). The translated message is then securely transmitted to edge device A.

In the depicted embodiment, the network manager 116 and/or message translator 134 also receives a message from edge device N (or originating from edge device N) directed to the device management service (the message may be directed to another service of the provider network as a destination endpoint). The network manager decrypts and/or authenticates the message based on the local credentials assigned for edge device A and translates the message into a translated message based at least on a mapping 204 of the service credentials assigned for edge device N to local credentials assigned for edge device N (e.g., by applying the service credentials to the message). The translated message is then securely transmitted to the device management service.

As shown, the managed network and/or the network manager may include an edge device repository 206 that is synchronized to a master device repository 120 of the provider network. In embodiments, in response to changes to one or more of the attributes of the master device repository of the managed network, the device management service may transmit the one or more updated attributes/changes of the master device repository to the managed network. The managed network may then update the one or more attributes in the edge device repository 206 at the managed network to synchronize at least a portion of the edge device repository 206 with the master device repository 120.

Figure 3:
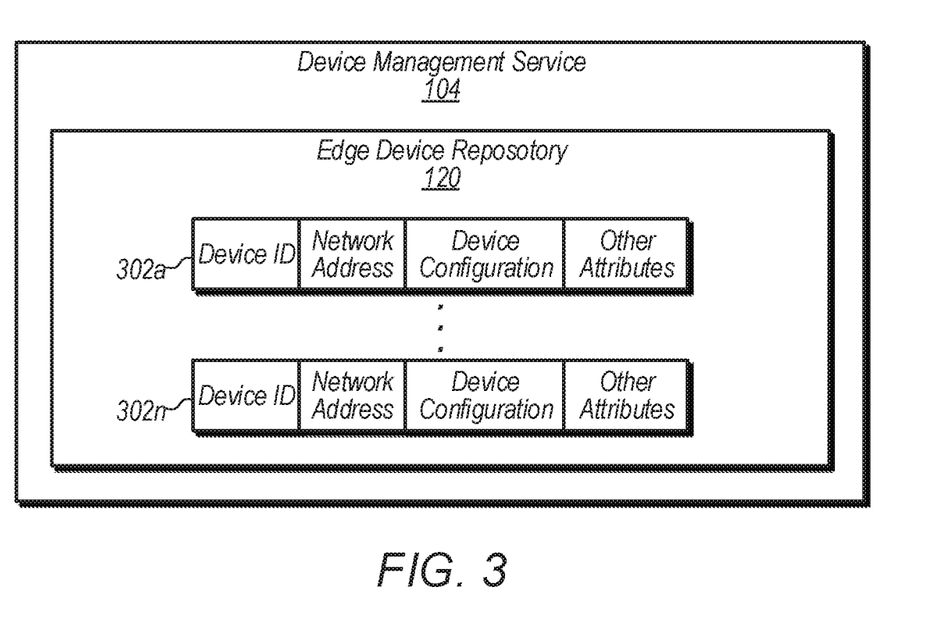
FIG. 3 illustrates an edge device repository maintained by a device management service of a provider network, according to one embodiment.

FIG. 3 illustrates an edge device repository maintained by a device management service of a provider network, according to one embodiment. As shown, the edge device repository 120 may include any number of records 302 that each indicate an edge device of a managed network and/or any number of attributes for the edge device.

As depicted, a record may indicate a particular edge device using a unique ID (device ID), a network address of the edge device on the managed network, a configuration of the edge device, and/or any number of other attributes for the edge device. In embodiments, the record may indicate a network security protocol used for the edge device, an access policy for a service and/or a data store of the provider network, and/or one or more permissions assigned to the edge device that indicate whether the edge device can publish and/or retrieve a message on one or more defined topics.

In embodiments, in response to receiving a message that comprises a request to publish or retrieve a message on a defined topic, the device management service may accept or deny the request to publish or retrieve the message on the defined topic based at least on the permissions assigned to the edge device (e.g., indicated by the device repository for the edge device). In some embodiments, in response to receiving a message that comprises a request to publish or retrieve a message that comprises a request to access a service or a data store at the provider network, the device management service may accept or deny the request to access the service or the data store based at least on the access policy indicated by the device repository for the edge device.

Figure 4:
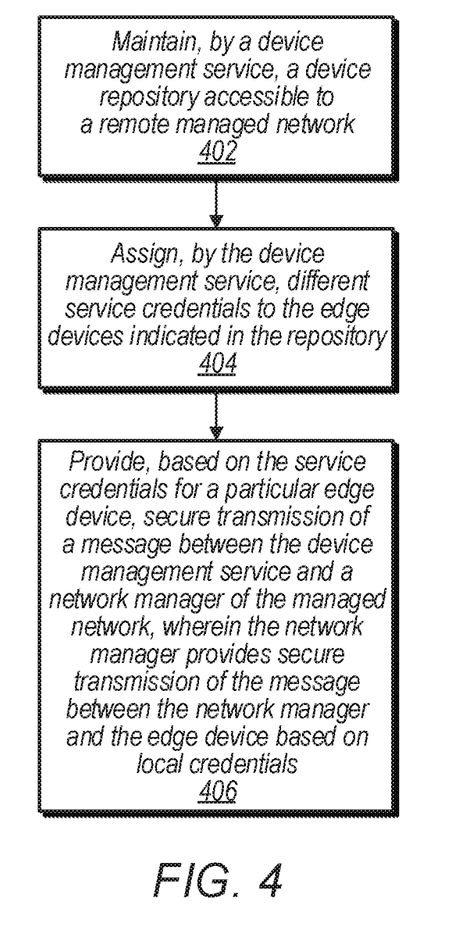
FIG. 4 is a flowchart illustrating a method for providing secure communication with individual edge devices of a remote managed network that uses local credentials for secure communication with the edge devices, according to one embodiment.

FIG. 4 is a flowchart illustrating a method for providing secure communication with individual edge devices of a remote managed network that uses local credentials for secure communication with the edge devices, according to one embodiment.

At block 402, the device management service maintains a device repository accessible to a remote managed network. At block 505, the device management service assigns different service credentials to the edge devices indicated in the device repository. At block 406, the device management service provides, based on the service credentials for an edge device, secure transmission of a message between the device management service and a network manager of the managed network. In embodiments, the network manager provides secure transmission of the message between the network manager and the edge device based on local credentials assigned for the edge device (different credentials than the service credentials assigned for the edge device).

Figure 5A:
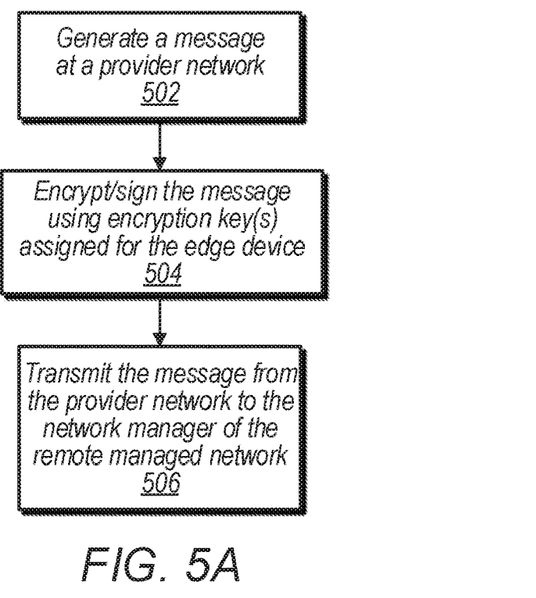
FIG. 5A is a flowchart illustrating a method for transmitting a message directed to an edge device from a provider network to a network manager of a remote managed network, according to one embodiment.

FIG. 5A is a flowchart illustrating a method for transmitting a message directed to an edge device from a provider network to a network manager of a remote managed network, according to one embodiment.

At block 502, the device management service generates a message at the provider network. In embodiments, the device management service may generate the message by receiving the message from another service or device of the provider network and received by the router 130. At block 504, the device management service encrypts and/or signs the message using one or more encryption keys assigned for the edge device. At block 506, the device management service transmits the encrypted and/or signed message from the provider network to the network manager of the remote managed network.

Figure 5B:
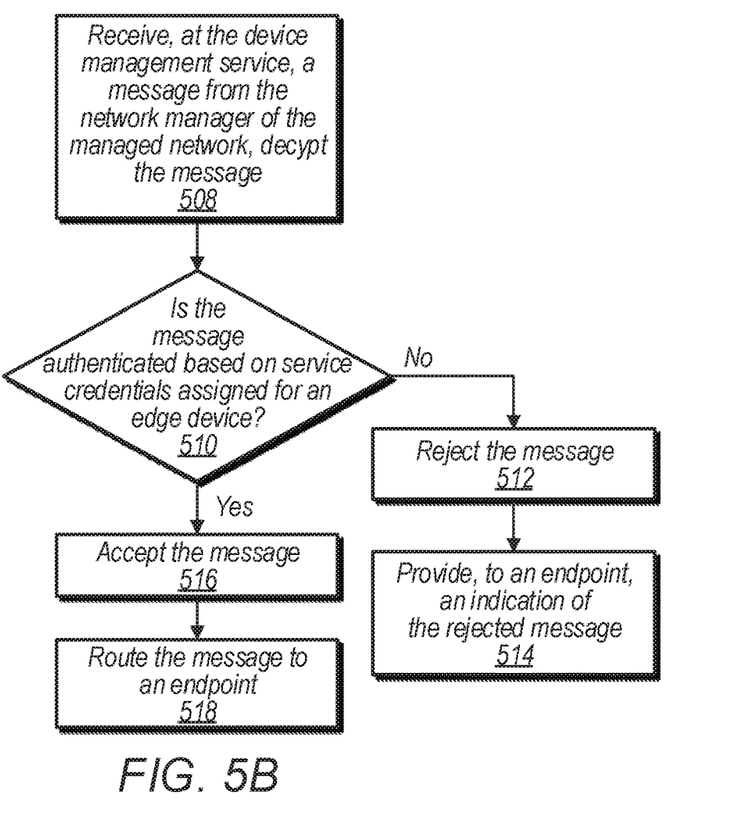
FIG. 5B is a flowchart illustrating a method for authenticating a message received from a remote managed network based on service credentials assigned for an edge device of the remote managed network, according to one embodiment.

FIG. 5B is a flowchart illustrating a method for authenticating a message received from a remote managed network based on service credentials assigned for an edge device of the remote managed network, according to one embodiment.

At block 508, the device management service receives an encrypted and/or signed message from the network manager of the managed network and may decrypt the message (e.g., using one or more encryption keys). At block 510, the device management service determines whether the message is authenticated (e.g., verifying a digital signature) based on service credentials assigned for an edge device of the managed network (e.g., one or more encryption keys). If the message is not authenticated, then at block 512, the device management service rejects the message and at block 514, the device management service provides an indication of the rejected message to an endpoint (e.g., to a client or administrator). In embodiments, the device management service may reject the message (determines that the message is not authenticated) in response to determining that one or more service credentials (e.g., encryption key(s)) used to sign the message are invalid (e.g., not assigned to any of the edge devices).

At block 510, if the device management service determines that the message is authenticated based on service credentials assigned for an edge device of the managed network, then at block 516, the device management service accepts the message and at block 518, the device management service routes the message to an endpoint (e.g., another service of the provider network).

Figure 6:
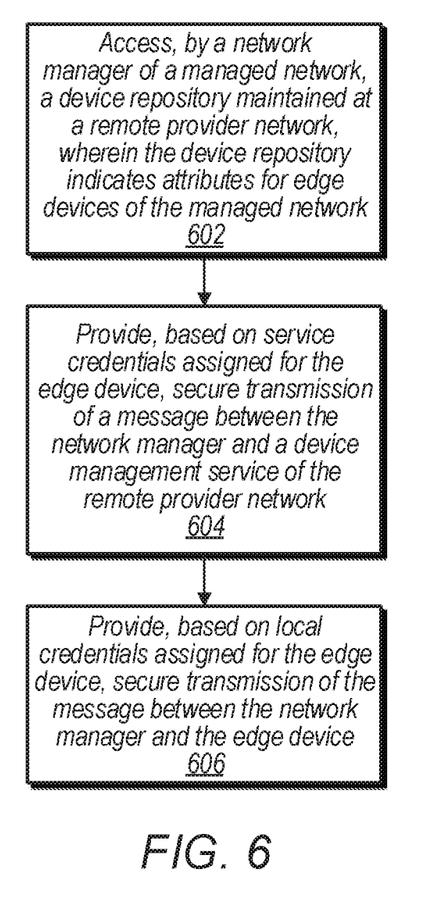
FIG. 6 is a flowchart illustrating a method for providing, based on service credentials for an edge device, secure transmission of a message between a network manager of a managed network and a device management service of a remote provider network and providing, based on local credentials for the edge device, secure transmission of the message between the network manager and the edge device, according to one embodiment.

FIG. 6 is a flowchart illustrating a method for providing, based on service credentials for an edge device, secure transmission of a message between a network manager of a managed network and a device management service of a remote provider network and providing, based on local credentials for the edge device, secure transmission of the message between the network manager and the edge device, according to one embodiment.

At block 602, the network manager of the managed network accesses a device repository maintained at a remote provider network (e.g., via the edge device repository interface 206). At block 604, the network manager provides, based on service credentials assigned to the edge device, secure transmission of a message between the network manager and a device management service of the remote provider network.

At block 606, the network manager provides, based on local credentials assigned for the edge device, secure transmission of the message between the network manager and the edge device.

Figure 7A:
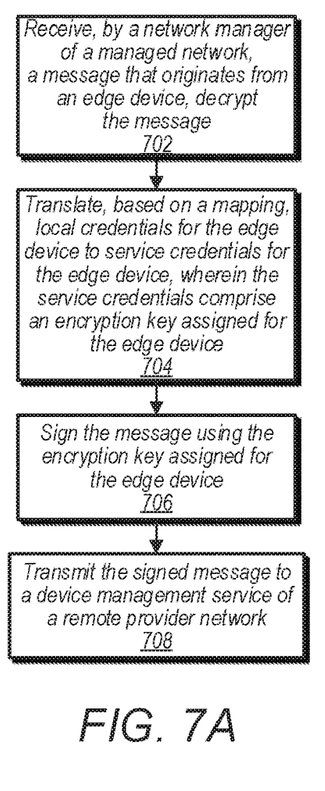
FIG. 7A is a flowchart illustrating a method for transmitting a message originating from an edge device from a network manager of a remote managed network to a device management service of a provider network, according to one embodiment.

FIG. 7A is a flowchart illustrating a method for transmitting a message originating from an edge device from a network manager of a remote managed network to a device management service of a provider network, according to one embodiment.

At block 702, the network manager receives an encrypted and/or signed message from an edge device (or that originates from an edge device) and may decrypt and/or authenticate the message based on local credentials. At block 704, the network manager translates, based on a mapping, the local credentials assigned for the edge device to service credentials assigned for the edge device. In embodiments, the service credentials comprise one or more encryption keys assigned for the edge device by the device management service.

At block 706, the network manager encrypts and/or signs the message using the encryption key(s) assigned for the edge device. At block 708, the network manager transmits the message to a device management service of a remote provider network.

Figure 7B:
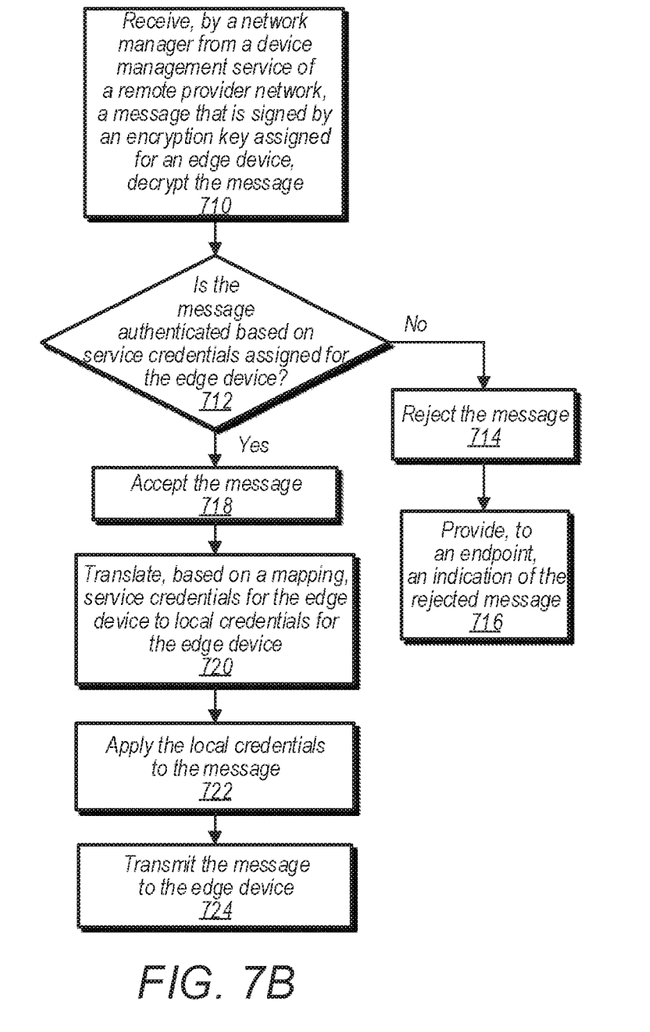
FIG. 7B is a flowchart illustrating a method for authenticating a message received at a remote managed network from a remote provider network based on service credentials assigned for an edge device of the remote managed network, according to one embodiment.

FIG. 7B is a flowchart illustrating a method for authenticating a message received at a remote managed network from a remote provider network based on service credentials assigned for an edge device of the remote managed network, according to one embodiment.

At block 710, the network manager receives an encrypted and/or signed message and may decrypt the message (e.g., using an encryption key(s) assigned for an edge device of the managed network). At block 712, the network manager determines whether the message is authenticated (e.g., verifying a digital signature) based on service credentials (e.g., one or more encryption keys) assigned for the edge device. If the message is not authenticated, then at block 714, the network manager rejects the message and at block 716, the network manager provides, to an endpoint, an indication of the rejected message (e.g., to a client or administrator).

At block 712, if the network manager determines that the message is authenticated based on service credentials assigned for the edge device, then at block 718, the network manager accepts the message and at block 720, the network manager translates the service credentials for the edge device to local credentials for the edge device based on a mapping.

At block 722, the network manager applies the local credentials to the message. At block 724, the network manager securely transmits the message to the edge device based at least on the local credentials.

Any of various computer systems may be configured to implement processes associated with the provider network, device management service, repository, network manager, or any other component of the above figures. For example, FIG. 8 is a block diagram illustrating an example computer system that implements some or all of the techniques described herein, according to some embodiments.

Figure 8:
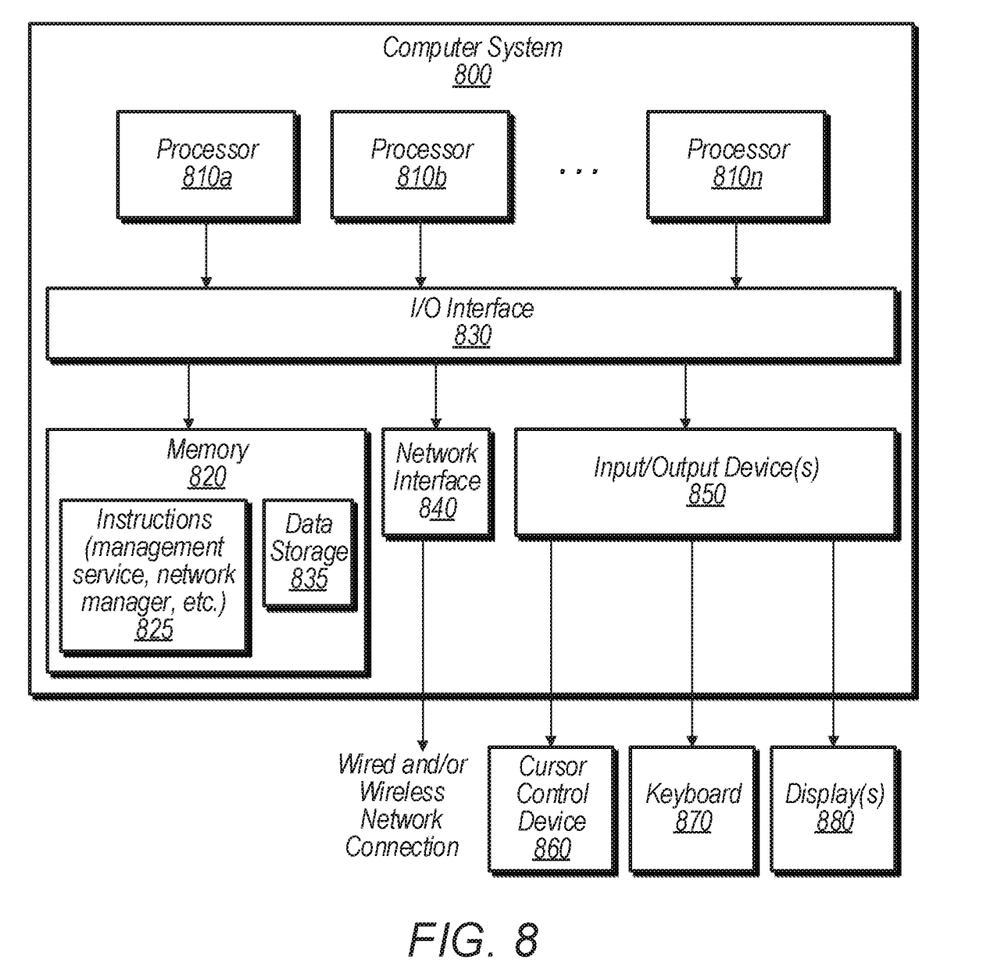
FIG. 8 is a block diagram illustrating an example computer system that implements some or all of the techniques described herein, according to some embodiments.

In various embodiments, the provider network, device management service, repository, network manager, or any other component of any of FIGS. 1-10 may each include one or more computer systems 800 such as that illustrated in FIG. 8. In embodiments, the provider network, device management service, repository, network manager, or any other component may include one or more components of the computer system 800 that function in a same or similar way as described for the computer system 800.

In the illustrated embodiment, computer system 800 includes one or more processors 810 coupled to a system memory 820 via an input/output (I/O) interface 830. Computer system 800 further includes a network interface 840 coupled to I/O interface 830. In some embodiments, computer system 800 may be illustrative of servers implementing enterprise logic or a downloadable application, while in other embodiments servers may include more, fewer, or different elements than computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be embedded processors implementing any of a variety of instruction set architectures (ISAs), such as the x106, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor 810. In various embodiments, system memory 820 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the provider network (e.g., device management service, repository), network manager, client devices/networks, or remote networks are shown stored within system memory 820 as program instructions 825. In some embodiments, system memory 820 may include data 835 which may be configured as described herein.

In one embodiment, I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may be configured to allow data to be exchanged between computer system 800 and other computer systems 800 or devices attached to a network, such as the local network discussed above, a wide-area network, or a local network within the provider network, for example. In particular, network interface 840 may be configured to allow communication between computer system 800 and/or various I/O devices 850. I/O devices 850 may include scanning devices, display devices, input devices and/or other communication devices, as described herein. Network interface 840 may commonly support one or more wireless networking protocols (e.g., Wi-Fi/IEEE 802.11, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 800 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In some embodiments, I/O devices 850 may be relatively simple or "thin" client devices. For example, I/O devices 850 may be configured as dumb terminals with display, data entry and communications capabilities, but otherwise little computational functionality. However, in some embodiments, I/O devices 850 may be computer systems configured similarly to computer system 800, including one or more processors 810 and various other devices (though in some embodiments, a computer system 800 implementing an I/O device 850 may have somewhat different devices, or different classes of devices).

In various embodiments, I/O devices 850 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 850 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 800. In general, an I/O device 850 (e.g., cursor control device 860, keyboard 870, or display(s) 880 may be any device that can communicate with elements of computing system 800.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the provider network, device management service, repository, network manager, other components, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
   one or more computing devices of a provider network comprising respective processors and memory to implement a device management service, wherein the device management service is configured to, for individual ones of one or more remote managed networks:
   maintain a device repository accessible to the managed network, wherein the device repository indicates attributes for respective edge devices of the managed network;
   assign unique service credentials to the respective edge devices indicated by the device repository, wherein the unique service credentials uniquely identify individual ones of the edge devices; and
   for a particular edge device of the respective edge devices:
   subsequent to the assignment, by the device management service, of the unique service credentials to the respective edge devices indicated by the device repository, provide, based on unique service credentials assigned by the device management service to the particular edge device, secure transmission of a message between the device management service and a network manager of the managed network that controls communication to and from the respective edge devices, wherein the network manager provides secure transmission of the message between the network manager and the particular edge device based on local credentials assigned to the particular edge device.

2. The system as recited in claim 1, wherein the service credentials comprise an encryption key assigned for the particular edge device, and wherein to provide secure transmission of the message between the device management service and a network manager of the managed network, the device management service is configured to:
   sign the message using the encryption key assigned for the particular edge device; and
   securely transmit the signed message to the network manager of the managed network, wherein the network manager applies the local credentials to the message to provide the secure transmission of the message to the particular edge device.

3. The system as recited in claim 1, wherein the service credentials comprise an encryption key assigned for the particular edge device, and wherein to provide secure transmission of the message between the device management service and a network manager of the managed network, the device management service is configured to:
   receive the message from the network manager; and
   decrypt the message using the encryption key.

4. The system as recited in claim 1, wherein the service credentials comprise an encryption key assigned for the particular edge device, and wherein the device management service is configured to:
   receive another message from the network manager as a signed message, wherein the other message is signed by another encryption key; and
   in response to determining that the other encryption key is invalid, reject the message.

5. The system as recited in claim 1, wherein device repository is a master device repository, and wherein the device management service is further configured to:
   transmit one or more of the attributes of the master device repository to the managed network, wherein the managed network updates the one or more attributes in another device repository at the managed network to synchronize at least a portion of the other device repository with the master device repository.

6. The method as recited in claim 1, wherein device repository is a master device repository, and further comprising:
   transmitting one or more of the attributes of the master device repository to the managed network, wherein the managed network updates the one or more attributes in another device repository at the managed network to synchronize at least a portion of the other device repository with the master device repository.

7. A method, comprising:
   performing, by one or more computing devices implementing a device management service of a provider network:
      maintaining a device repository accessible to a remote managed network, wherein the device repository indicates attributes for respective edge devices of the managed network;
      assigning unique respective service credentials to the respective edge devices indicated by the device repository, wherein the unique service credentials uniquely identify individual ones of the edge devices;
      for a particular edge device of the respective edge devices:
         subsequent to the assignment, by the device management service, of the unique service credentials to the respective edge devices indicated by the device repository, providing, based on unique service credentials assigned by the device management service to the particular edge device, secure transmission of a message between the device management service of the provider network and a network manager of the managed network, wherein the network manager provides secure transmission of the message between the network manager and the particular edge device based on local credentials assigned to the particular edge device.

8. The method as recited in claim 7, wherein the service credentials comprise an encryption key assigned for the particular edge device, and wherein providing secure transmission of the message between the device management service and a network manager of the managed network comprises:
   signing the message based on the service credentials;
   encrypting the message using the encryption key assigned for the particular edge device; and
   transmitting the message to the network manager of the managed network, wherein the network manager applies the local credentials to the message to provide the secure transmission of the message to the particular edge device.

9. The method as recited in claim 7, wherein the service credentials comprise an encryption key assigned for the particular edge device, and wherein providing secure transmission of the message between the device management service and a network manager of the managed network comprises:
   receiving the message from the network manager; and
   decrypting the message using the encryption key.

10. The method as recited in claim 9, wherein the message comprises a request to publish or retrieve a message on a defined topic, and wherein the method further comprises:
   accepting or denying the request to publish or retrieve the message on the defined topic based at least on permissions assigned to the particular edge device.

11. The method as recited in claim 9, wherein the attributes for the respective edge devices comprise an access policy, wherein the message comprises a request to access a service or a data store at the provider network, and wherein the method further comprises:
   accepting or denying the request to access the service or the data store based at least on the access policy indicated by the device repository for the particular edge device.

12. The method as recited in claim 7, wherein the device repository comprises a directory-based data store.

13. The method as recited in claim 12, further comprising:
   accessing the one or more attributes of the device repository in accordance with a lightweight directory access protocol (LDAP).

14. The method as recited in claim 7, wherein providing secure transmission of the message between the device management service and a network manager of the managed network comprises:
   providing the secure transmission of the message between the device management service and the network manager according to a network security protocol, wherein the network manager provides secure transmission of the message between the network manager and the particular edge device according to a different network security protocol.

15. One or more non-transitory computer-accessible storage media storing program instructions that when executed on or across one or more processors of a managed network cause the one or more processors to implement a network manager to:
- access a device repository maintained at a device management service of a remote provider network, wherein the device repository indicates attributes for respective edge devices of the managed network;
- for a particular edge device of the respective edge devices indicated by the device repository:
  - subsequent to assignment of unique service credentials to the respective edge devices indicated by the device repository, provide, based on unique service credentials assigned by the device management service to the particular edge device, secure transmission of a message between the network manager and the device management service of the remote provider network, wherein the unique service credentials uniquely identify individual ones of the edge devices; and
  - provide, based on local credentials assigned for the edge particular device, secure transmission of the message between the network manager and the particular edge device.

16. The one or more storage media as recited in claim 15, wherein the service credentials comprise an encryption key assigned for the particular edge device, and wherein to provide secure transmission of the message between the network manager and the device management service, the program instructions when executed on or across the one or more processors cause the one or more processors to:
- encrypt the message using the encryption key assigned for the particular edge device, wherein the message originates from the particular edge device; and
- transmit the message to the device management service.

17. The one or more storage media as recited in claim 15, wherein the service credentials comprise an encryption key assigned for the particular edge device, and wherein to provide secure transmission of the message between the network manager and the device management service, the program instructions when executed on or across the one or more processors cause the one or more processors to:
- receive the message from the device management service; and
- decrypt the message using the encryption key.

18. The one or more storage media as recited in claim 15, wherein to provide secure transmission of the message between the network manager and the device management service and to provide secure transmission of the message between the network manager and the particular edge device, the program instructions when executed on or across the one or more processors cause the one or more processors to:
- provide secure transmission between the network manager and the device management service according to a network security protocol and provide secure transmission between the network manager and the particular edge device according to a different network security protocol.

19. The one or more storage media as recited in claim 15, further comprising program instructions that when executed on or across the one or more processors further cause the one or more processors to:
- maintain a mapping of the service credentials for the particular edge device to the local credentials for the particular edge device.

20. The one or more storage media as recited in claim 19, wherein to provide secure transmission of the message between the network manager and the device management service or to provide secure transmission of the message between the network manager and the particular edge device, the program instructions when executed on or across the one or more processors cause the one or more processors to:
- translate, based on the mapping, the service credentials for the particular edge device to the local credentials for the particular edge device and apply the local credentials to the message, or
- translate, based on the mapping, the local credentials for the particular edge device to the service credentials for the particular edge device and apply the service credentials to the message.

\* \* \* \* \*